United States Patent [19]
Bonville, Jr. et al.

[11] Patent Number: 6,015,634
[45] Date of Patent: Jan. 18, 2000

[54] SYSTEM AND METHOD OF WATER MANAGEMENT IN THE OPERATION OF A FUEL CELL

[75] Inventors: Leonard J. Bonville, Jr., Marlborough; Deliang Yang, Vernon, both of Conn.

[73] Assignee: International Fuel Cells, South Windsor, Conn.

[21] Appl. No.: 09/081,626

[22] Filed: May 19, 1998

[51] Int. Cl.$^7$ .................................................. H01M 8/04
[52] U.S. Cl. .............................. 429/17; 429/19; 429/24; 429/26; 429/30
[58] Field of Search .................................. 429/17, 24, 26, 429/30, 19

[56] References Cited

U.S. PATENT DOCUMENTS

| | | |
|---|---|---|
| 4,202,933 | 5/1980 | Reiser et al. . |
| 4,333,992 | 6/1982 | Healy . |
| 4,769,297 | 9/1988 | Reiser et al. . |
| 4,859,545 | 8/1989 | Scheffler et al. . |
| 4,902,586 | 2/1990 | Wertheim . |
| 5,308,456 | 5/1994 | Kunz et al. . |
| 5,316,869 | 5/1994 | Perry, Jr. et al. ...................... 429/19 |

*Primary Examiner*—Arun S. Phasge
*Attorney, Agent, or Firm*—McCormick, Paulding & Huber LLP

[57] ABSTRACT

A PEM fuel cell system includes a PEM fuel cell that has an input and output port each for fuel or reformate, process air and coolant. A predetermined fraction of volume of moistened exhaust air leaving the air output port of the fuel cell is diverted back and combined with fresh, air at ambient temperature entering the air input port of the PEM fuel cell to maintain water balance in the fuel cell at high ambient operating temperatures. The recycle-to-air vent ratio is controlled by a processor which adjusts the recycle flow based on the ambient temperature and the power level of the fuel cell.

9 Claims, 5 Drawing Sheets

SYSTEM AND METHOD OF WATER MANAGEMENT IN THE OPERATION OF A FUEL CELL

FIELD OF THE INVENTION

The present invention relates generally to PEM fuel cell operation, and more particularly to a PEM fuel cell system and method of maintaining water balance or self-sufficiency at high ambient operating temperatures.

BACKGROUND OF THE INVENTION

Various fuel cell types, defined by their electrolyte, have particular design requirements. In a proton exchange membrane (PEM) fuel cell, one requirement is to provide an effective water management system. A PEM fuel cell includes a membrane confined between respective porous cathode and anode electrodes. These electrodes include the combination of a relatively thin catalyst layer and a porous support plate where the catalyst layer may be deposited either on respective major surfaces of the proton exchange membrane or on the porous support plate. In general, fuel cells function by supplying a gaseous fuel and oxidant to the anode electrode and cathode electrode, respectively. These supply means for the fuel and the oxidant gas distribute the same as uniformly as possible over the catalyzed surfaces of the respective electrodes. In a PEM fuel cell, the electrochemical reaction occurring at the electrodes, when the fuel cell operates, results in electrons and hydrogen ions being formed at the anode. The electrons flow through an external load circuit and the hydrogen ions flow through the membrane to the cathode where they react with oxygen to form water and also release thermal energy. Fuel cells also have a coolant path for guiding water near the electrodes in the cell stack to prevent the fuel cell from overheating.

Preferably, the loss of water evaporated from the cell and removed through the process vents is balanced by the production of water as a by-product of the chemical reaction taking place within the cell stack less that required for fuel processing. Water balance permits water to be recycled in a closed-loop system, thereby avoiding the need and expense to replenish water in the fuel cell system. Maintaining water balance or self-sufficiency is important when powering, for example, automobiles which are not in constant contact with an external water source for replenishment.

As an example, a gasoline powered ambient pressure PEM fuel cell power plant is a fully integrated system that must be self-sufficient in water to be viable. Self-sufficiency means that enough of the water that is formed as a result of the chemical reaction in the cell must be recovered by the system to provide the water that is required to convert the gasoline to hydrogen in the fuel processing system. Water is produced within the cell as a result of the electrochemical reaction and is removed from the cell as a liquid or vapor by well known means. The water vapor in the exit gas streams is partially recovered by passing the air exhaust vent through a condenser to cool the air exhaust vent resulting in the formation of condensate. The condensate is recovered, accumulated and fed to the fuel processing system as required. There are ambient temperature conditions where a PEM fuel cell with single-pass airflow does not recover enough water to be self-sufficient.

For proton exchange membrane (PEM) fuel cells, a drawback to a self-contained water management system is that using relatively dry ambient air as one of the reactants tends to cause a greater loss of water than is generated by the reaction between hydrogen and oxygen in the reactants when operating at high ambient temperatures. Further, excessive loss of water at high ambient operating temperatures can dry out and permanently damage the membranes of the cell stack.

In response to the foregoing, it is an object of the present invention to provide a PEM fuel cell system which overcomes the drawbacks and disadvantages of prior PEM fuel cell systems in maintaining water balance at high ambient temperatures. The above and other objects and advantages of this invention will become more readily apparent when the following description is read in conjunction with the accompanying drawings.

SUMMARY OF THE INVENTION

In one aspect of the present invention, a PEM fuel cell system includes a PEM fuel cell having a coolant input port and coolant output port, a fuel input port and fuel output port, and an air input port and air output port. The air input port is to be coupled to a source of fresh air at about ambient temperature. An adjustable airflow splitter, such as an airflow valve, has an input port, first and second output ports, and a control port for adjusting a ratio of volume of the exhaust air exiting the first output port of the airflow splitter to a volume of the exhaust air exiting the second output port (recycle-to air vent ratio). The input port of the airflow splitter is coupled to the air output port of the PEM fuel cell. The first output port of the splitter communicates with the air input port of the PEM fuel cell. An ambient temperature measuring device is provided for generating a temperature signal. An electrical power measuring device is coupled to electrodes of the fuel cell for generating a power signal indicative of the percentage of rated power being generated by the fuel cell. A processor has inputs coupled to the temperature measuring device, and the electrical power measuring device and an output coupled to the control input of the airflow splitter. The processor controls the airflow splitter for adjusting the recycle-to-air vent ratio of the fuel cell system to a predetermined value as a function of the power output of the fuel cell system to maintain an overall water balance in the fuel cell system at the sensed ambient operating temperature. The system may also include a coolant level sensor which slightly increases the recycle-to-air vent ratio if the amount of water stored in the system drops below a predetermined value or level.

In another aspect of the present invention, a method of operating a PEM fuel cell system includes providing a PEM fuel cell. Fuel or reformate is conducted through the fuel cell via a fuel input port and fuel output port. A coolant is conducted through the PEM fuel cell via a coolant input port and coolant output port. Fresh air at about ambient temperature is conducted through the PEM fuel cell via an air input port and air output port. The ambient operating temperature of the fuel cell and the power output of the fuel cell are measured. The airflow splitter is adjusted to divert a predetermined fraction of volume of exhaust air back to the air input port of the fuel cell to adjust a power output of the fuel cell to a predetermined percentage of its rated power output which will maintain an overall water balance in the fuel cell system at the sensed ambient operating temperature.

DETAILED DESCRIPTION OF THE PREFERRED EMBODIMENT

Figure 1:
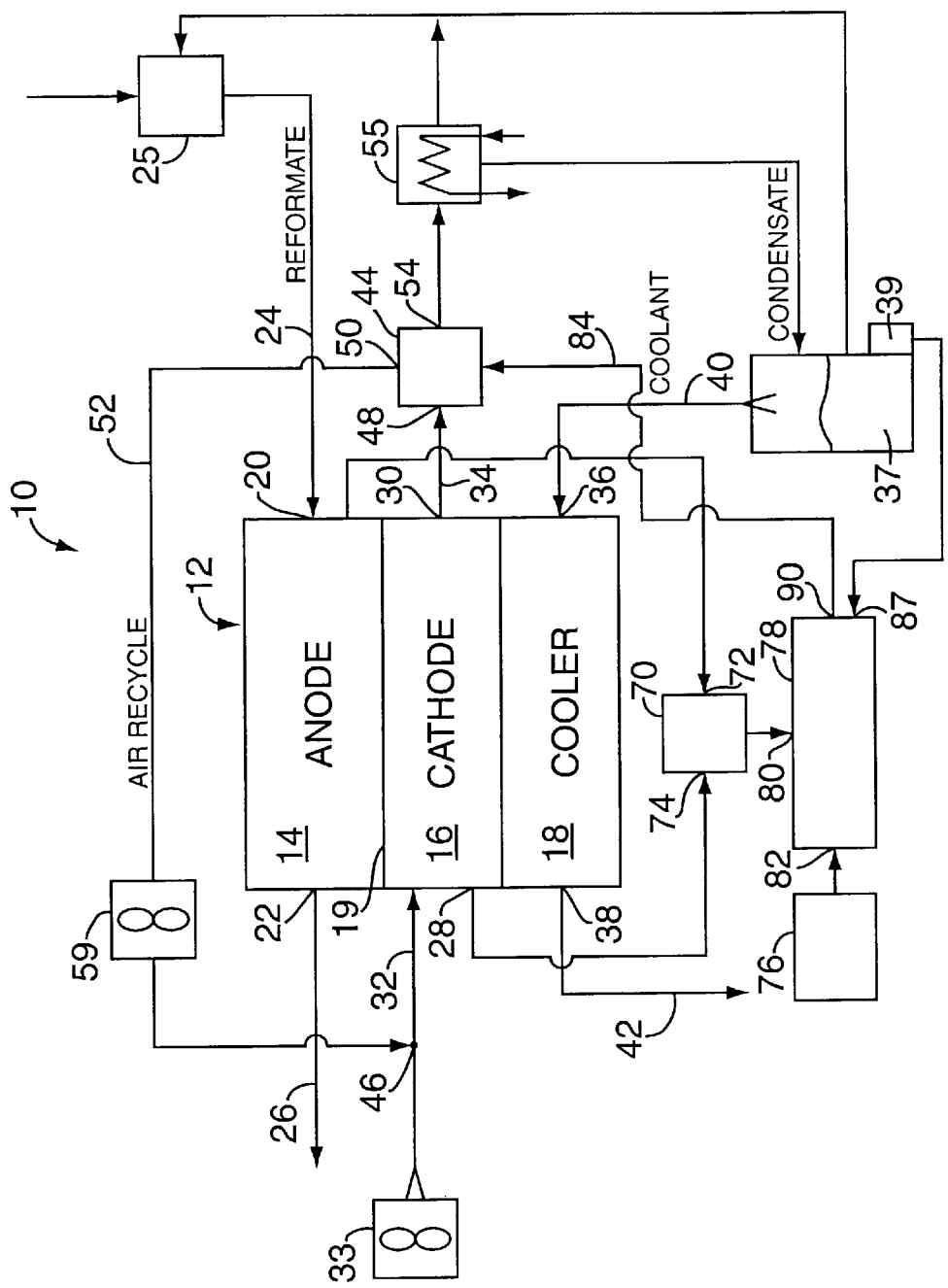
FIG. 1 is a schematic illustration of a PEM fuel cell system with process air recycle.

Turning now to FIG. 1, a PEM fuel cell system is generally designated by the reference number 10. The fuel cell system comprises a PEM fuel cell 12 including at least one anode electrode 14, cathode electrode 16, a proton exchange membrane 19 provided between the anode and cathode, and cooler section 18. The fuel cell includes a fuel input port 20 and a fuel output port 22 which cooperate to supply a pre-heated hydrogen rich fuel or reformate, such as a fuel derived by reforming gasoline, ethanol, methane or methanol, across the anode 14 of the cell stack. The fuel input port 20 communicates with a fuel supply line 24 for receiving the hydrogen rich fuel from a conventional fuel processing system 25, such as a reformer that processes the reformate. The fuel output port 22 communicates with a fuel exhaust line 26 for transporting exhaust fuel back to, for example, a burner (not shown). The PEM fuel cell 12 further includes a process air input port 28 and process air exhaust port 30 for supplying ambient air across the cathode of the cell stack. The process air input port 28 communicates with a process air supply line 32 for receiving the process air that is supplied to the fuel cell by, for example, a blower 33. The process air exhaust port 30 communicates with an air exhaust line 34 for transporting exhaust process air away from the fuel cell 12. The fuel cell further includes a coolant input port 36 and coolant output port 38 for supplying water or other coolant near the cell stack to prevent overheating as the cell stack generates electricity from the electrochemical reaction between the fuel and the process air. The coolant input port 36 communicates with a coolant supply line 40 for receiving the coolant from a water source 37 such as a water tank. The coolant output port 38 communicates with a coolant output line 42 for transporting the coolant away from the fuel cell 12 to be cooled, for example, by a radiator.

The fuel cell system 10 further includes an airflow splitter or means for diverting a predetermined percentage or fraction of a volume of exhaust process air back to the air input port 28. The diverting means may be realized, for example, by an adjustable airflow valve 44. The airflow valve has an input port 48 communicating with the air exhaust port 30 of the PEM fuel cell 12 for receiving exhaust air, a first output port 50 for diverting exhaust air along an air recycle line 52, and a second output port 54 for discharging or venting the remaining exhaust process air to a water recovery condenser 55. The recovery condenser 55 supplies condensate formed thereat to the water source 37. A mix point 46 receives fresh, ambient air supplied, for example, by the blower 33, and further receives from the air recycle line 52, via a blower 59, the diverted exhaust process air. The mixture of fresh and exhaust or moistened process air is then fed from the mix point 46 to the process air input port 28 of the PEM fuel cell 12. The mix point 46 may be separate from the process air input port 28, as shown in FIG. 1, or alternatively may be at the process air input port.

The fuel cell system further includes an electrical power measuring device 70 having first and second inputs 72, 74 for generating an electrical power signal based on electrical signal inputs along the lines 72, 74 generated from the anode and cathode electrodes of the fuel cell 12, respectively. A temperature measuring device 76 senses the ambient operating temperature of the fuel cell system. A coolant level sensor 39 senses the water level in the water source 37. A processor, such as a conventional microprocessor 78, has first, second and third inputs 80, 82 and 87 for respectively receiving the electrical power measurement, the ambient temperature measurement, and the coolant level sensor measurement. The microprocessor 78 has an output 84 coupled to a control input of the airflow valve 44 for adjusting the fraction of exhaust process air which is diverted back to the air input port 28 of the PEM fuel cell 12 as a function of the ambient temperature and percentage of rated power output of the fuel cell 12 in order to maintain water balance.

The coolant level sensor 39, such as a low level sensor, may be employed as an additional safeguard to maintain water balance independently of the ambient temperature and power output of the fuel cell system. For example, the coolant level sensor 39 sends a signal to the processor 78 informing the processor to slightly increase the recycle-to-air vent ratio when the amount of coolant stored in the water tank 37 drops below a predetermined level or value.

In order to maintain water balance or self-sufficiency, conventional PEM fuel cell systems which, for example, operate on gasoline and air at nominally ambient pressure are limited to an ambient operating temperature of about 75° F. Fuel cells which operate at higher ambient temperatures will lose more water than is produced at the cell stack, and will therefore require make up water for fuel processing. In fact, at ambient temperatures of about 100° F., a conventional PEM fuel cell system will require make-up water across its entire operating power range.

One factor in balancing water in PEM fuel cells is the difference between the humidity or amount of moisture in the process air received at the process air input port 28 and that of the process air leaving the process air exhaust port 30. Conventional PEM fuel cells typically use ambient process air that is passed once through the fuel cell. The ambient air entering the fuel cell is dry relative to the process air leaving the fuel cell which has picked-up moisture on the cathode side of the cell stack due to the generation of water as hydrogen from the reformate or fuel reacts with oxygen in the process air. The somewhat large difference in vapor pressure between the relatively dry ambient air entering the fuel cell and the moistened process air leaving the fuel cell results in more water being lost due to evaporation through the process air vent than is generated by the electrochemical reaction at the cell stack.

It has been found that recycling a portion of the exhaust process air brings about water balance at higher ambient temperatures of, for example, about 90° F. to about 100° F. for a gasoline and air based power plant. The moistened exhaust process air which is combined with fresh ambient air before the process air input port 28 increases the humidity (i.e., dewpoint) of the process air at the air input port 28 of the fuel cell 12. Consequently, the difference between the vapor pressures of the process air at the air input port 28 and the air output port 30 of the fuel cell 12 is decreased relative to fuel cells using single-pass process air. The decreased difference in vapor pressure results in less water evaporating and being lost through the air exhaust vent off of the air output port relative to water generated by the fuel cell electrochemical reaction. This decreased vapor pressure difference results in water balance or self-sufficiency at higher ambient temperatures (i.e., as high as about 100° F.)

relative to systems having a large difference in vapor pressures. Thus, a self-contained water management system is achievable over a wide range of ambient operating temperatures compared with PEM fuel air. Moreover, the danger of process air. Moreover, the danger of drying out and damaging the cell stack membranes due to a high level of water evaporation is minimized.

Achieving water balance will now be explained with reference to FIG. 1. In operation, the coolant is supplied from the water source 37 and enters the coolant input port 36. The coolant prevents the fuel cell from overheating at ambient operating temperature as high as about 100° F. By way of example, reformate with about 40% to about 45% hydrogen (dry base) saturated from the fuel processing of gasoline in the fuel processing system 25, enters the PEM fuel cell 12 at the fuel input port 20. After reaction with about 80% utilization or consumption of the hydrogen, the fuel leaves the cell stack at the fuel output port 22 in a saturated state. Simultaneously, the process air enters the PEM fuel cell 12 at ambient temperature via the blower 33 at the process air input port 28. The electrochemical reaction occurring at the electrodes results in electrons and hydrogen ions being formed at the anode. The electrons flow through an external load circuit (not shown) and the hydrogen ions flow through the membrane to the cathode where they react with oxygen to form water and also release thermal energy. The moistened process air then leaves the PEM fuel cell 12 via the air exhaust port 30. The process air leaving the fuel cell 12 then enters the adjustable airflow valve 44 at the input port 48 where a fraction of the moistened exhaust process air is diverted through the first output port 50 of the valve 44 and, by means of the blower 59, along the air recycle line 52. The recycled air is then combined or mixed at the mix point 46 with the fresh, ambient temperature air supplied by the blower 33 such that the mixed air is humidified. The humidified process air then enters the air input port 28 of the fuel cell 12.

Generating electrical power, for example, in a gasoline/air power plant at high ambient operating temperatures of about 90° F. to about 100° F. while maintaining water balance is achieved by diverting an adjustable percentage of process air leaving the air exhaust port 30 of the PEM fuel cell 12 back into the air input port 28. This ratio is expressed as the recycle-to-air vent ratio which is defined as the ratio of air volume diverted back to the fuel cell input via the first output port 50 of the first airflow valve 44 to the volume of air that leaves the second output port 54 of the first airflow valve 44 for recovery of water therefrom. Preferably, the recycle-to-air vent ratio is about two to achieve water balance at high ambient temperatures such as about 90° F. to about 100° F., but may be adjusted slightly upwardly to maintain water balance if the ambient temperature further increases.

The recycling of the process air allows a higher process air temperature leaving the fuel cell 12 at the air exhaust port 30 relative to standard PEM fuel cell systems which employ single-pass process airflow. Air recycle results in an increased air or oxygen utilization, or percentage of oxygen that is used in the process air to generate water by-product. For example, a conventional PEM fuel cell system having about a 30% air utilization for single-pass process airflow will exhibit about a 55% air utilization when about two-thirds volume of the exhaust process air is diverted back to the air input port of the fuel cell (i.e., a recycle-to-air vent ratio of about two). An increase in air utilization, in turn results in a higher air dewpoint of the process air, and therefore allows a higher temperature in the process air leaving the fuel cell 12. The higher temperature process air permits the PEM fuel cell to operate at a higher ambient operating temperature while maintaining water self-sufficiency (i.e., without losing more water through the exhaust vent than is produced at the cell stack).

A trade-off of operating a PEM fuel cell in high ambient temperatures is that the percentage of rated power that the PEM fuel cell can generate while maintaining water balance lowers as the ambient temperature increases. Another trade-off is that employing air recycle or further increasing the recycle-to-air vent ratio in order to operate at higher ambient temperatures reduces oxygen concentration in the process air, which in turn lowers the electrical efficiency. Hence, recycle-to-air vent ratio values which maintain water balance are a function of both the ambient operating temperature and the percentage of rated power being generated by the fuel cell. As mentioned above, the recycle-to-air vent ratio may also be a function of the coolant level stored in the system as an additional safeguard to maintaining water balance.

The microprocessor 78 thus receives ambient temperature information from the temperature measuring device 76, power output information from the electrical power measuring device 70, and preferably coolant level information from the coolant level sensor 39 in order to adjust the recycle-to-air vent ratio via the airflow valve 44 of the fuel cell 12 to a level which can maintain water balance at the sensed ambient temperature. The ratio values for maintaining water balance can be easily determined by subjecting a PEM fuel cell system to a range of ambient operating temperatures and determining for each temperature the recycle-to-air vent ratio associated with the highest percentage of rated output power the fuel cell system can generate while maintaining water balance. As will be explained more fully later, FIG. 4 is an example of such a relationship between ambient operating temperature and percentage of rated output power which achieves water balance for a gasoline powered PEM fuel cell system.

Figure 2:
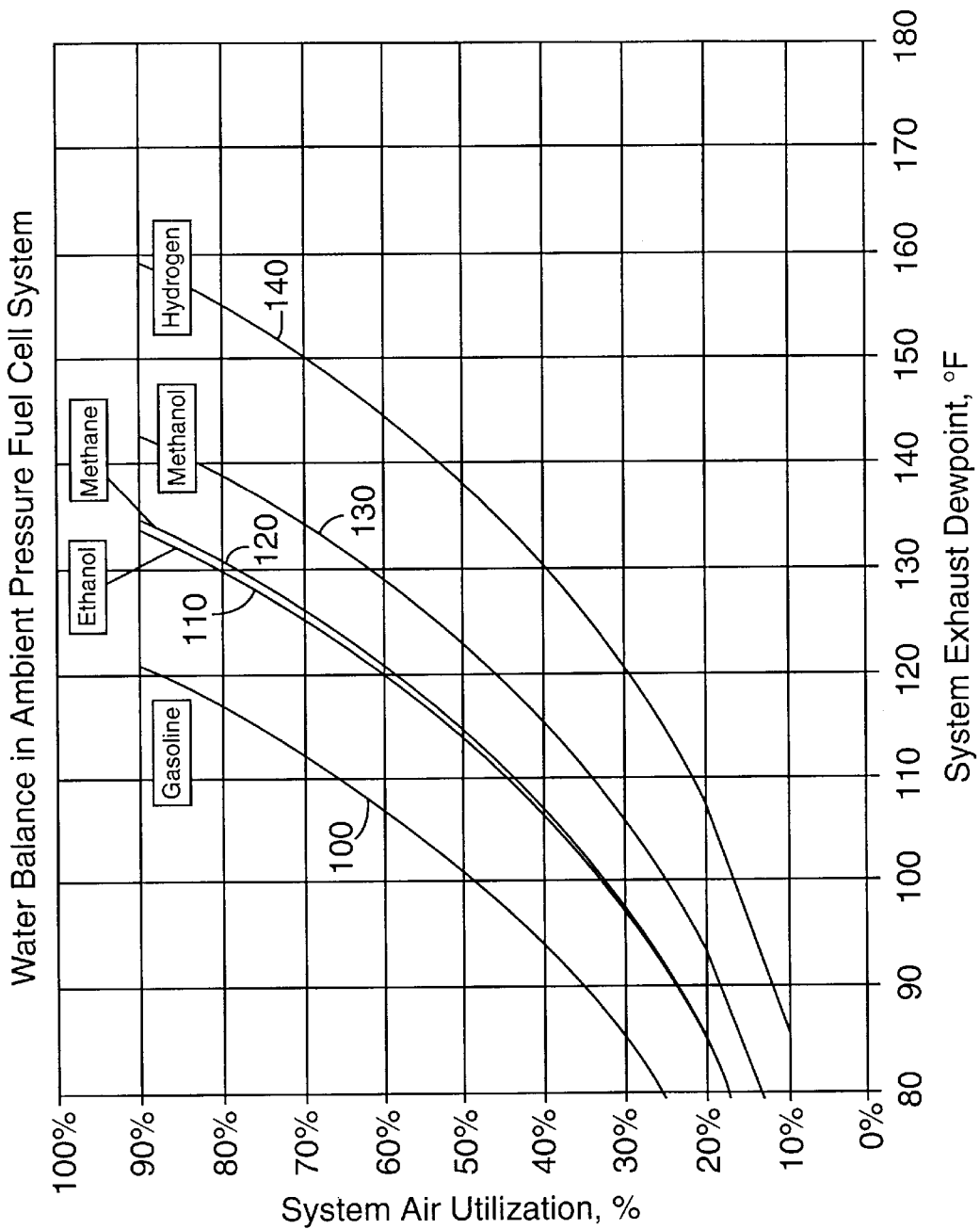
FIG. 2 is a graph illustrating water balance in a fuel cell system.

FIG. 2 illustrates the relationship between the exhaust process air dewpoint and system air utilization among various fuels for maintaining water balance or self-sufficiency in an ambient pressure PEM fuel cell system. The curves 100, 110, 120, 130 and 140 show the relationship between exhaust process air dewpoint and system air utilization for various respective fuels: gasoline, ethanol, methane, methanol and hydrogen. As can be seen by the curves 100–140, water balance is maintained at increasingly higher exhaust process air dewpoints as the air utilization increases. Raising the air utilization reduces the vapor pressure difference between the process air at the air input port and the air output port of the fuel cell, whereby less water evaporates through the air exhaust vent. As a result of increasing the system air utilization, water balance is achieved at increasingly higher exhaust process air dewpoints, which in turn permits the gasoline/air PEM fuel cell to operate without loss of water at higher ambient temperatures of about 90° F. to about 100° F. relative to fuel cells employing single-pass process air.

Figure 3:
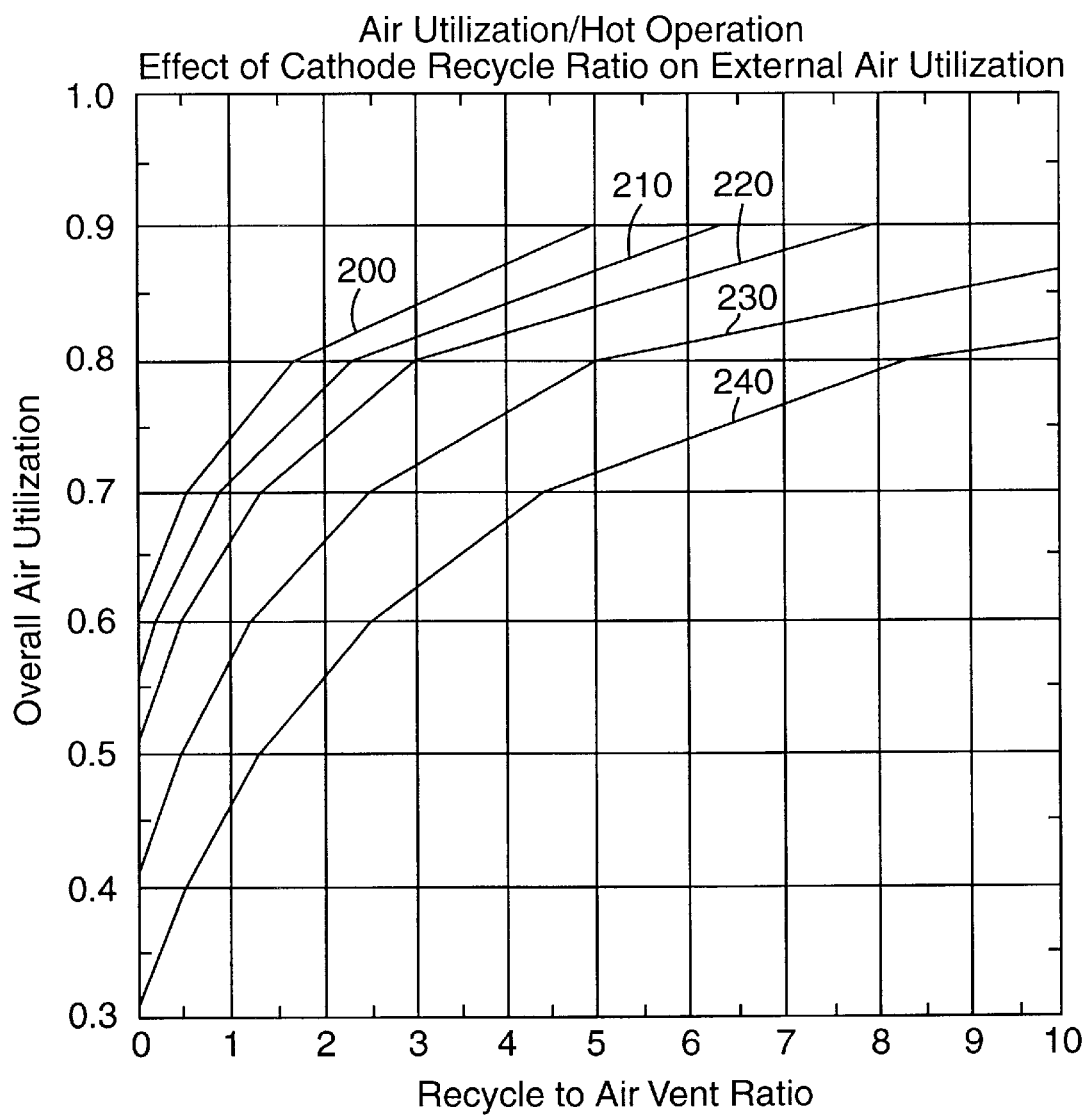
FIG. 3 is a graph illustrating the effect of cathode recycle to air vent ratio on external air utilization.

FIG. 3 illustrates the function of recycling the exhaust process air on the overall air utilization for various single-pass utilizations. Specifically, curves 200, 210, 220, 230 and 240 respectively show overall air utilization for single-pass utilizations of 30%, 40%, 50%, 55% and 60%. As can be seen by the curves 200–240, increasing the volume of exhaust process air that is recycled (i.e., increasing the recycle-to-air vent ratio) increases the overall air utilization. Increasing the overall air utilization increases the system exhaust dewpoint (FIG. 2) which in turn increases the ambient temperature in which the PEM fuel cell system operates while maintaining water balance.

Figure 4:
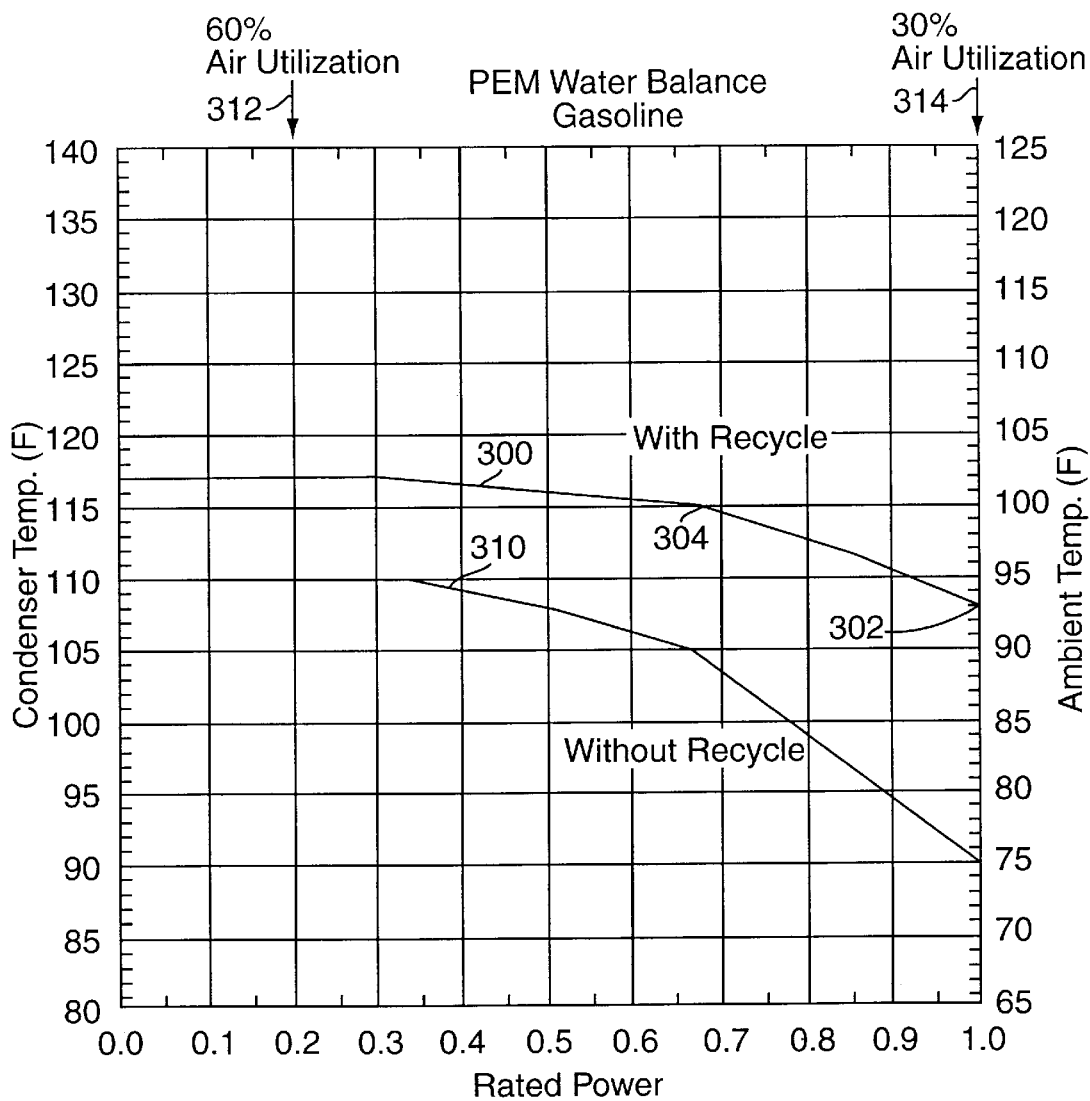
FIG. 4 is a graph illustrating the relationship of condenser/ambient temperatures and rated power of PEM fuel cell systems for maintaining water balance with and without cathode air recycle.

FIG. 4 illustrates the relationship of ambient and condenser operating temperatures to the rated power output of a gasoline powered ambient pressure PEM fuel cell system while maintaining water balance. FIG. 4 is based on an air utilization schedule that varies linearly from about 60% air utilization at about 20% of rated power (abscissa position corresponding to 20% rated power shown at reference line 312) to about 30% air utilization at about 100% of rated power (abscissa position corresponding to 100% rated power shown at reference line 314). Curve 300 shows this relationship with process air recycle, and curve 310 shows this relationship without process air recycle. As can be seen by the curve 300, the benefit of recycling the process air at the cathode side of the PEM fuel cell is that water balance can be maintained at an ambient temperature as high as between about 90° F. to about 95° F. when the fuel cell is operating at its full rated power. By contrast, the curve 310 shows that a PEM fuel cell system using a single-pass process airstream can maintain water balance only at ambient temperatures as high as about 75° F. Hence, recycling the process air permits a PEM fuel cell system to maintain water balance over a larger range of ambient operating temperatures relative to single-pass air systems.

The curve 300 further illustrates one of the previously mentioned trade-offs that as the ambient temperature rises, the rated power output of the fuel cell must lower in order to maintain water balance. For example, a fuel cell operating with air recycle can maintain water balance at full rated power at an ambient temperature of about 93° F., as shown at point 302 along the curve 300. However, as the ambient temperature rises to about 100° F., the continuous maximum output power of the fuel cell must drop to about 67% of its rated value in order to maintain water balance, as shown at point 304 along the curve 300. However, instantaneous power is not affected.

Figure 5:
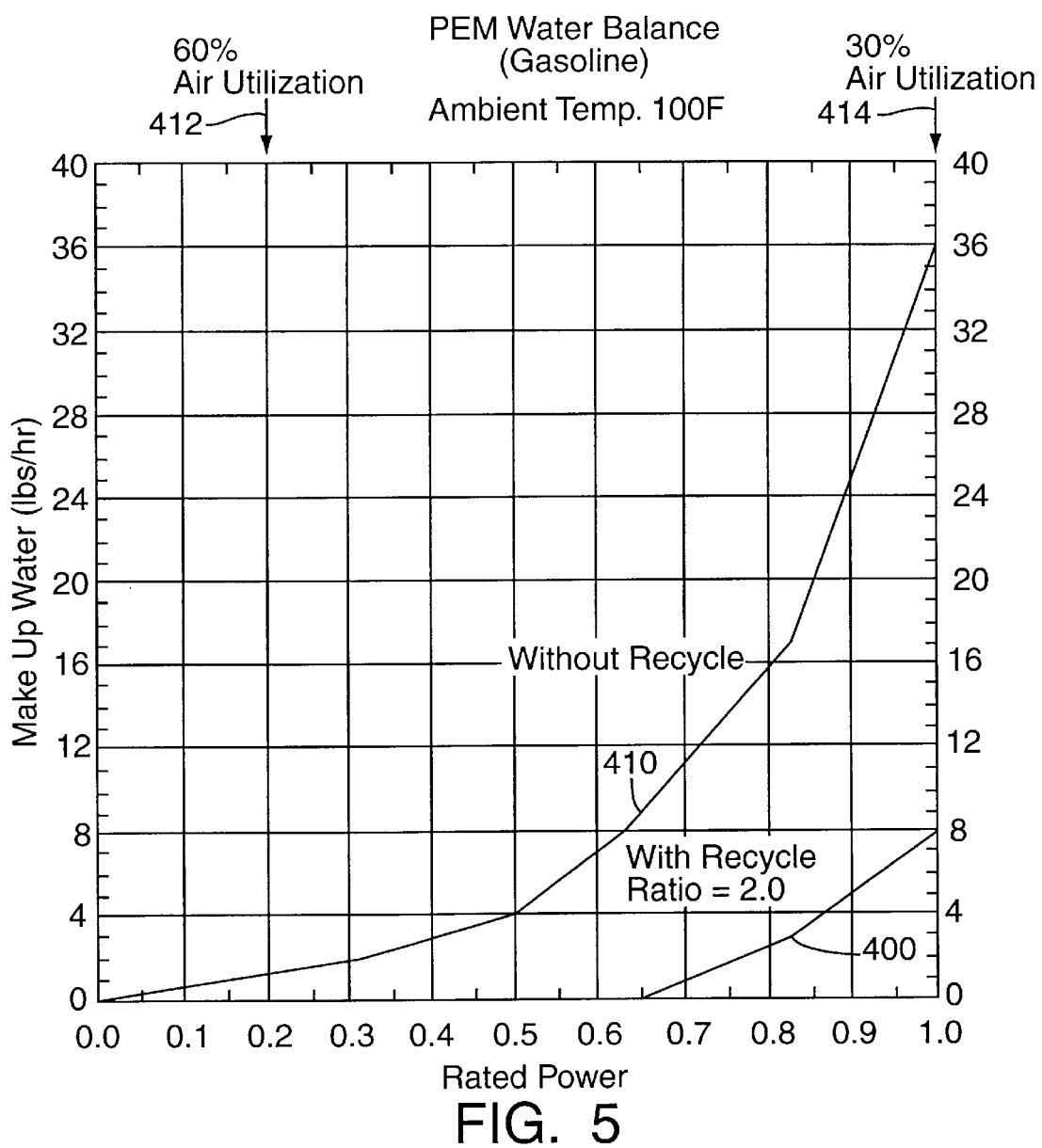
FIG. 5 is a graph illustrating the relationship of make up water and rated power of PEM fuel cell systems with and without cathode air recycle.

FIG. 5 illustrates the relationship between make up water and power output of a gasoline powered ambient pressure 50 kw PEM fuel cell system operating at an ambient temperature of about 100° F. FIG. 5 is based on an air utilization schedule that varies linearly from about 60% air utilization at about 20% of rated power (abscissa position corresponding to 20% rated power shown at reference line 412) to about 30% air utilization at about 100% of rated power (abscissa position corresponding to 100% rated power shown at reference line 414). Curve 400 shows the relationship for a PEM fuel cell with air recycle at a recycle-to-air vent ratio of two, and curve 410 shows the relationship in a PEM fuel cell system without air recycle. As shown by the curve 410, make-up water is required over the full power output range of a PEM fuel cell system which uses single-pass process air. By contrast, curve 400 shows that water balance or self-sufficiency is maintained for an air recycle PEM fuel cell system over a range of 0% to about 67% of its rated power output, as was also shown in FIG. 4 at the point 304 along the curve 300.

Such a fuel cell system with process air recycle is feasible for powering, for example, automobiles. Automobiles seldom operate at 100% of rated power for an extended period of time. Typically, automobiles operate at about 25% to about 50% of rated power. Consequently, it is feasible for an automobile PEM fuel cell system with air recycle to accumulate water at cruise conditions or low operation power, and to consume water during high power operation such that an overall water balance or self-sufficiency is maintained.

Although this invention has been shown and described with respect to an exemplary embodiment thereof, it should be understood by those skilled in the art that the foregoing and various other changes, omissions, and additions in the form and detail thereof may be made therein without departing from the spirit and scope of the invention. Accordingly, the present invention has been shown and described by way of illustration rather than limitation.

What is claimed is:

1. A PEM fuel cell system comprising:

a PEM fuel cell having a coolant input port and coolant output port, a fuel input port and fuel output port, and an air input port and air output port, the air input port to be coupled to a source of fresh air at about ambient temperature;

an adjustable airflow splitter having an input port, first and second output ports, and a control port for adjusting a ratio of volume of air exiting the first output port of the airflow splitter to a volume of air exiting the second output port (recycle-to-air vent ratio), the input port of the airflow splitter being coupled to the air output port of the PEM fuel cell, the first output port of the splitter communicating with the air input port of the PEM fuel cell;

an ambient temperature measuring device for generating a temperature signal;

an electrical power measuring device coupled to electrodes of the fuel cell for generating a power signal indicative of the percentage of rated power being generated by the fuel cell; and a processor having inputs coupled to the temperature measuring device, the electrical power measuring device and an output coupled to the control input of the airflow splitter, the processor controlling the airflow splitter for adjusting the recycle-to-air vent ratio of the fuel cell system to a predetermined value to maintain an overall water balance in the fuel cell system at the sensed ambient operating temperature and power level.

2. A PEM fuel cell system as defined in claim 1, wherein the processor adjusts the airflow splitter to divert about two-thirds volume (recycle-to-air vent ratio of about two) of exhaust air leaving the air output port of the fuel cell back to the air input port of the PEM fuel cell.

3. A PEM fuel cell system as defined in claim 1, wherein the airflow splitter diverts a predetermined fraction of exhaust air volume leaving the air output port of the fuel cell back to the air input port of the PEM fuel cell in order to raise the air utilization from about 30% for single-pass airflow to about 55%.

4. A PEM fuel cell system as defined in claim 1, further including a coolant level sensor coupled to an input of the processor for informing the processor to slightly increase the recycle-to-air vent ratio when the amount of coolant stored in the fuel cell system drops below a predetermined level or value.

5. A method of operating a PEM fuel cell system, comprising the steps of;

providing a PEM fuel cell;

conducting fuel or reformate through the fuel cell via a fuel input port and fuel output port;

conducting coolant through the PEM fuel cell via a coolant input port and coolant output port;

conducting fresh, air at about ambient temperature through the PEM fuel cell via an air input port and air output port;

measuring the ambient operating temperature of the fuel cell;

measuring a power output of the fuel cell; and adjusting the airflow splitter to divert a predetermined fraction of volume of exhaust air leaving the air output port of the fuel cell back to the air input port of the fuel cell to maintain an overall water balance in the fuel cell system at the sensed ambient operating temperature.

6. A method as defined in claim 5, wherein the predetermined fraction of volume of exhaust process air diverted back to the air input port of the PEM fuel cell is about two-thirds (i.e., a recycle-to-air vent ratio about two).

7. A method as defined in claim 5, wherein the step of providing a PEM fuel cell includes providing a fuel cell adapted to achieve 30% air utilization for a single-pass process airflow in order to achieve about a 55% air utilization for the PEM fuel cell system with a fraction of exhaust air leaving the air output port of the fuel cell diverted back to the air input port of the fuel cell.

8. A method as defined in claim 5, wherein the step of conducting fuel or reformate includes conducting fuel or reformate with about 40% to about 45% hydrogen (dry base).

9. A method as defined in claim 5, further including the steps of measuring a coolant amount or level stored in the fuel cell system, and adjusting the airflow splitter to slightly increase a fraction of volume of exhaust air diverted back to the air input port of the fuel cell when the coolant falls below a predetermined level or value.

* * * * *